Patented June 15, 1948

2,443,485

UNITED STATES PATENT OFFICE 2,443,485

ANTIBACTERIAL SUBSTANCE AND METHOD OF PRODUCING IT

Selman A. Waksman, Highland Park, and Harold Boyd Woodruff, Princeton, N. J., assignors, by mesne assignments, to Rutgers Research and Endowment Foundation, New Brunswick, N. J., a nonprofit corporation of New Jersey No Drawing. Application January 19, 1943, Serial No. 472,846

4 Claims. (Cl. 260—236.5)

This invention relates to new and useful improvements in bio-chemical substances and, more particularly, to new and useful improvements in antibiotic substances.

In accordance with our invention, a new, powerful antibiotic substance, which we have called streptothricin, is prepared from cultures of certain Actinomycetes, notably certain strains of a type described as *Actinomyces lavendulae* (Waksman, Horning, Welsch, & Woodruff, Soil Science, vol. 54, pp. 281-296, 1942).

Our new substance, streptothricin, is an organic material, having the characteristics of a base, and of low nitrogen content. It is not affected by proteolytic enzymes. It is soluble in water, acid-alcohol, and in dilute mineral acid but not soluble in ether, petroleum ether, and chloroform. It is inactivated by concentrated acids and alkalis. Streptothricin is thermostable, being substantially resistant to heat at 100° C. for 15 minutes.

Streptothricin is active both bacteriostatically and bactericidally but does not exert a lytic effect, and higher concentrations are required for streptothricin to be effective bactericidally than are required for its bacteriostatic effectiveness. It is substantially non-toxic to animals when injected into the bloodstream or when taken orally.

The bacteriostatic action of streptothricin is unique, as compared with that of other antibiotic substances of microbial origin, such as actinomycin A or B, actinomycetin, lysozyme of Actinomyces, tyrothricin, tyrocidine, penicillin, pyocyanase, pyocyanin, etc., in that it is highly effective, in small concentrations, against certain gram-negative bacteria such as *E. coli*, and the *Salmonella*, *Shigella*, and *Brucella* groups, but only slightly against *Ps. fluorescens*. Also, streptothricin is highly active against certain gram-positive bacteria, such as *Bac. subtilis*, but not against other very closely related gram-positive bacteria, such as *Bac. mycoides*. In the selectivity of its action, streptothricin is entirely different from other antibiotic substances derived from Actinomyces.

On electrodialysis, streptothricin moves to the cathode at pH 7.0.

Streptothricin may be produced by inoculating a suitable medium with spores of *Actinomyces lavendulae*, and permitting growth to proceed for from about 6 to 12 days, at about 20-28° C.

After completion of growth, and filtration of the medium, streptothricin may be recovered from the filtrate.

According to one preferred embodiment of our invention, the recovery of the streptothricin may be effected by treating the above-mentioned filtrate, at neutral or alkaline pH, with an adsorbent such as activated carbon or permutite, the streptothricin being completely adsorbed thereon. The adsorbate is then eluted with low-normality alcoholic mineral acid, such as alcoholic hydrochloric acid, for example, after which the adsorbent material may be filtered off. Upon treating the filtrate thus obtained with ether, an aqueous layer forms, which is removed and evaporated to dryness.

According to another embodiment of our invention, the acid-alcoholic eluate containing streptothricin may be neutralized, and evaporated to dryness.

According to still another embodiment of our invention, the eluate obtained by washing the acid-alcoholic adsorbate is neutralized and concentrated just to dryness. The residue thus obtained is then extracted with absolute alcohol, filtered, and the alcohol evaporated.

The products obtained according to the above procedures may be further purified, as, for instance, by the method outlined in the example given hereinafter.

A suitable medium for the growth of *Actinomyces lavendulae*, for the production of streptothricin, may comprise an aqueous medium containing tryptone, casein, peptone, dibasic potassium phosphate, sodium chloride, and a carbohydrate, such as glucose, starch, etc. Traces of iron salts, such as ferrous sulfate, for example, may also be present, and appear to exert a beneficial effect upon the growth of *Actinomyces lavendulae*. The presence of a small amount of agar, talc, or other similar material, to aid in maintaining a surface pellicle of growth, is helpful in the production of streptothricin.

We have discovered, furthermore, that streptothricin is formed when *Actinomyces lavendulae* is grown on certain simple nitrogenous compounds, such as glycocoll, alanine, aspartic acid, asparagine, and glutamic acid, in the presence of a small amount of a carbohydrate. In the case of some of the amino acids, such as asparagine and glycocoll, for example, streptothricin is formed even in the complete absence of the carbohydrate. However, when streptothricin is produced upon an amino acid alone, in the absence of carbohydrate, there is a gradual increase in alkalinity, which results in the destruction of streptothricin, and for that reason, the pH of the medium should be periodically adjusted to near the neutral point.

The following example illustrates a method of carrying out the present invention, but it is to be understood that this example is given by way of illustration, and not of limitation.

*Example*

A medium consisting of 1.0% dextrose,
0.5% tryptone,
0.2% dibasic potassium phosphate,
0.2% sodium chloride, and distilled water, is distributed in appropriate vessels to a depth of 1-2 inches. The medium is sterilized at 15 lbs. steam pressure for 15-20 minutes, and then cooled.

A water suspension of spores of a strain of *Actinomyces lavendulae* is prepared by scraping from agar slants. The medium is inoculated with a heavy suspension of the Actinomyces spores. Incubation is at a temperature of 20-28° C. Streptothricin elaboration is usually complete in 6-12 days. Flakes of growth are filtered off wit muslin, and the broth is treated as follows:

To a batch of approximately 100 liters of filtered streptothricin broth are added 1500 gms. of active charcoal. The mixture is stored for about 8-12 hours at 0-10°, and stirred up at about two-hour intervals. It is then filtered. A colorless filtrate is obtained, and discarded. The charcoal residue is then suspended in 10 liters of 95% ethanol made 0.15 normal with hydrochloric acid. It is placed in an ice bath, stirred for two hours, and then permitted to stand for 8-12 hours in the cold. The suspension is filtered, the charcoal residue discarded, and the brown clear filtrate obtained is poured into 100 liters of ether, with stirring. An aqueous layer separates, and is drawn off. It is a black thick liquid. One liter of water is then added to the alcohol ether solution with stirring. The aqueous layer, which is a dark brown solution, is then drawn off. The aqueous solutions are neutralized to pH 6-7.

The material thus obtained may be further purified by treatment thereof with a substance to adsorb anions (for example, "Amberlite IR-4") and then treating it with a substance to adsorb cations (for example, "Amberlite IR-I"). The material is then filtered, and the filtrate is treated with acid-washed permutite. The adsorbate is eluted with dilute mineral acid. A colorless solution containing streptothricin is thus obtained.

Modifications may be made in carrying out the present invention, without departing from the spirit and scope thereof, and we are to be limited only by the appended claims.

We claim:

1. A process for the production of streptothricin comprising cultivating a culture medium inoculated with spores of a streptothricin-producing strain of *Actinomyces lavendulae* for about 6 to 12 days, at 20-28° C., filtering, adsorbing streptothricin from the filtrate, and recovering the adsorbed streptothricin by eluting with low normality alcoholic mineral acid.

2. A process for the production of streptothricin comprising cultivating a culture medium inoculated with spores of a streptothricin-producing strain of *Actinomyces lavendulae* for about 6 to 12 days, at about 20-28° C., filtering, treating the filtrate thus obtained with an adsorbent material, eluting the adsorbate with low-normality alcoholic mineral acid, filtering, treating the filtrate with ether, and recovering streptothricin from the aqueous layer thus formed.

3. In a process of producing streptothricin by cultivation in a culture medium of spores of *Actinomyces lavendulae* the steps which comprise treating the filtered culture medium contain streptothricin with an adsorbent material to adsorb streptothricin, and recovering the adsorbed streptothricin by eluting with low normality alcoholic mineral acid.

4. As a new composition of matter, an organic, antibiotic substance which is thermostable; which has the characteristics of a base; which is soluble in water, acid-alcohol, and dilute mineral acids and insoluble in ether, petroleum ether, and chloroform; which is strongly active bacteriostatically against the gram-negative bacteria *E. coli* and the bacteria of the *Salmonella*, *Shigella*, and *Brucella* groups, and against the gram-positive bacteria *B. subtilis*, said activities being strong in comparison with the relative inactivity, in bacteriostatic respects, which characterizes the aforesaid antibiotic substance toward *Ps. fluorescens* and *B. mycoides;* and which is identical with antibiotic material, having the aforesaid bacteriostatic characteristics, that is produced by cultivation of organisms of the species *Actinomyces lavendulae* only in artificial media not naturally occurring in soil and under conditions favorable to such production by such organisms.

SELMAN A. WAKSMAN.
HAROLD BOYD WOODRUFF.

REFERENCES CITED

The following references are of record in the file of this patent:

UNITED STATES PATENTS

| Number | Name | Date |
|---|---|---|
| 2,305,260 | Hamlet | Dec. 15, 1942 |

OTHER REFERENCES

Bergey, Manual of Determinative Bacteriology, 5th ed. (1939), page 865.

Waksman et al., Soil Science, vol. 1, page 126 (1916).

Waksman, Journal Bacteriology, October 1940, pp. 581-600.

Waksman, Journal Bacteriology, vol. 46 (Sept. 1943), pp. 299-300.

Welsch, Comptes rend. de Soc. de Biologie, vol. 124, pp. 1240-1242.